United States Patent Office 3,447,962
Patented June 3, 1969

3,447,962
METHOD OF AGGLOMERATING
William John Megowen, Carlisle, Mass., assignor of ten percent to The B. H. La Lone Company, Inc., New York, N.Y., a corporation of New York
No Drawing. Filed Dec. 13, 1965, Ser. No. 513,590
Int. Cl. C13f *3/00;* B03b *3/00*
U.S. Cl. 127—63                                   7 Claims

ABSTRACT OF THE DISCLOSURE

A method of agglomerating including agglomerating and breaking particles in a first stage to produce agglomerated particles of a predetermined maximum size, separating from the output of the first stage a fraction of particles in a predetermined size range, and subjecting this separated fraction to a second agglomerating and breaking stage.

---

This invention relates to agglomerating smaller particles into clusters to form thereby particles of larger particle size.

Objects of the invention include provision of a simple method of manufacture of agglomerates of larger size, greater uniformity of size, greater freedom from attached fines, and reduced density.

The invention features passing particles of a range of sizes in a first range through a first agglomerating stage, separating out from the product of this step agglomerated particles in a range of sizes in a second, larger, range characteristic of the primary output of an efficient agglomeration stage under all the circumstances of this first stage, passing the particles in the second range through a second agglomerating stage unaccompanied by particles outside the second range, and thereafter separating out from the product of this second agglomeration particles in a range of sizes in a third, still larger, range characteristic of the primary output of an efficient agglomeration stage under all the circumstances of the second stage. In preferred embodiments size separation is accomplished by air classification.

Other objects, features, and advantages will appear from the following description of a preferred embodiment.

Powdered sugar of particle size in the range for the most part of from 1 to 2 microns may be passed through an agglomerating apparatus of the character disclosed in Gidlow et al. United States Patent No. 2,995,773, Aug. 15, 1961, "Process and Apparatus for Agglomerating Pulverulent Materials," under conditions such that the average diameter of a large percent of the particles present was increased four times, or to a range of from 4 to 8 microns. Particles greater than 8 microns in size are broken in a breaking roll at the output end of the agglomerator. The particles emerging from this stage are given a size stabilization against later breakage by passing the particles briefly through a stream of air at a temperature above the melting point of the sugar.

The output of the first stage just described is then classified in an air classifier into a first fraction in the range of 4 to 8 microns, and another in the range up to 4 microns.

The last-mentioned range up to 4 microns is then recycled through the first stage agglomerator.

The fraction in the range of 4 to 8 microns may then be passed through a similar second stage agglomerating apparatus, under conditions to again increase average diameter of a large percentage of the particles four times, to a range of 16 to 32 microns. A breaking roll prevents output of particles larger than 32 microns, and the output is heat stabilized as before. Air classification separates the output into an up to 4 micron range, a 4 to 8 micron range, and 8 to 16 micron range, and the 16 to 32 micron range. The first is recycled to the first agglomerating stage, and the second is recycled to the second agglomerating stage. The third is passed through a breaking roll to decrease maximum diameter to 8 microns, and reclassified with the first stage output. The fourth is passed to a third stage.

The third stage agglomerator again increases the particle sizes of a large percent of the particles by a factor of 4, to a range of from 64 to 128 microns. Breaking roll action to set 128 microns as a maximum and size stabilization are as in the other stages. Air classification output is into ranges of 0–4, 4–8, 8–16, 16–32, 32–64, and 64–128. These ranges are respectively recycled to first stage input, recycled to second stage input, put through an 8 micron maximum breaker roll and reclassified with first stage output, recycled to the third stage input, put through a 32 micron maximum breaker roll and reclassified with second stage output, and passed out of the process as a whole.

Other embodiments within the invention will occur to those skilled in the art and are within the following claims.

What is claimed is:

1. A method of agglomerating which comprises the steps of:
    agglomerating and breaking particles in a first stage to produce agglomerated particles of size not greater than a first predetermined size;
    separating from the output of said first stage a fraction of said agglomerated particles, said fraction being in a first predetermined particle size range having said first predetermined size as an upper limit;
    subjecting said fraction in said first predetermined size range to a second agglomerating and breaking stage in the absence of particles of size outside said first size range to produce twice agglomerated particles of size not greater than a second predetermined size;
    separating from the output of said second stage a fraction of said twice agglomerated particles in a second predetermined size range having said second predetermined size as an upper limit, a fraction of said twice agglomerated particles in said first predetermined size range, and a fraction of said twice agglomerated particles of size smaller than said first and second predetermined size ranges; and
    recycling said fraction in said first predetermined size range through said second stage, and said fraction of size smaller than said first and second size ranges through said first stage.

2. The method of claim 1 including the step of subjecting said fraction in said second predtermined size range to a third agglomerating and breaking stage in the absence of particles of size outside said second size range.

3. The method of claim 2 in which said third stage agglomerates and breaks said fraction in said second predetermined range to produce particles of size not greater than a third predetermined size, and including the step of separating from the output of said third stage a fraction of said particles in a third predetermined size range having said third predetermined size as an upper limit.

4. The method of claim 3 including the step of recycling particles from the output of said third stage smaller than said third predetermined size range through at least one of said first, second and third stages.

5. The method of claim 4 in which said particles are of sugar.

6. The method of claim 4 in which said outputs of said stages are separated by air classification.

7. The method of claim 1 including the steps of separating from the output of said second stage a size fraction intermediate said first and second predetermined ranges and breaking said intermediate size particles to a size not greater than said first predetermined size and introducing said broken intermediate size particles into the output of said first stage.

References Cited

UNITED STATES PATENTS

| | | | |
|---|---|---|---|
| 2,436,771 | 2/1948 | Hood | 23—313 |
| 2,865,504 | 12/1958 | Zubrzycki | 209—138 |
| 2,995,773 | 8/1961 | Gidlow | 18—1 |
| 3,140,326 | 7/1964 | Erck | 264—117 |
| 3,347,638 | 10/1967 | Gerdes | 23—314 |

FRANK W. LUTTER, *Primary Examiner.*

U.S. Cl. X.R.

23—313; 209—3; 241—3, 24, 25; 264—117